Patented May 4, 1937

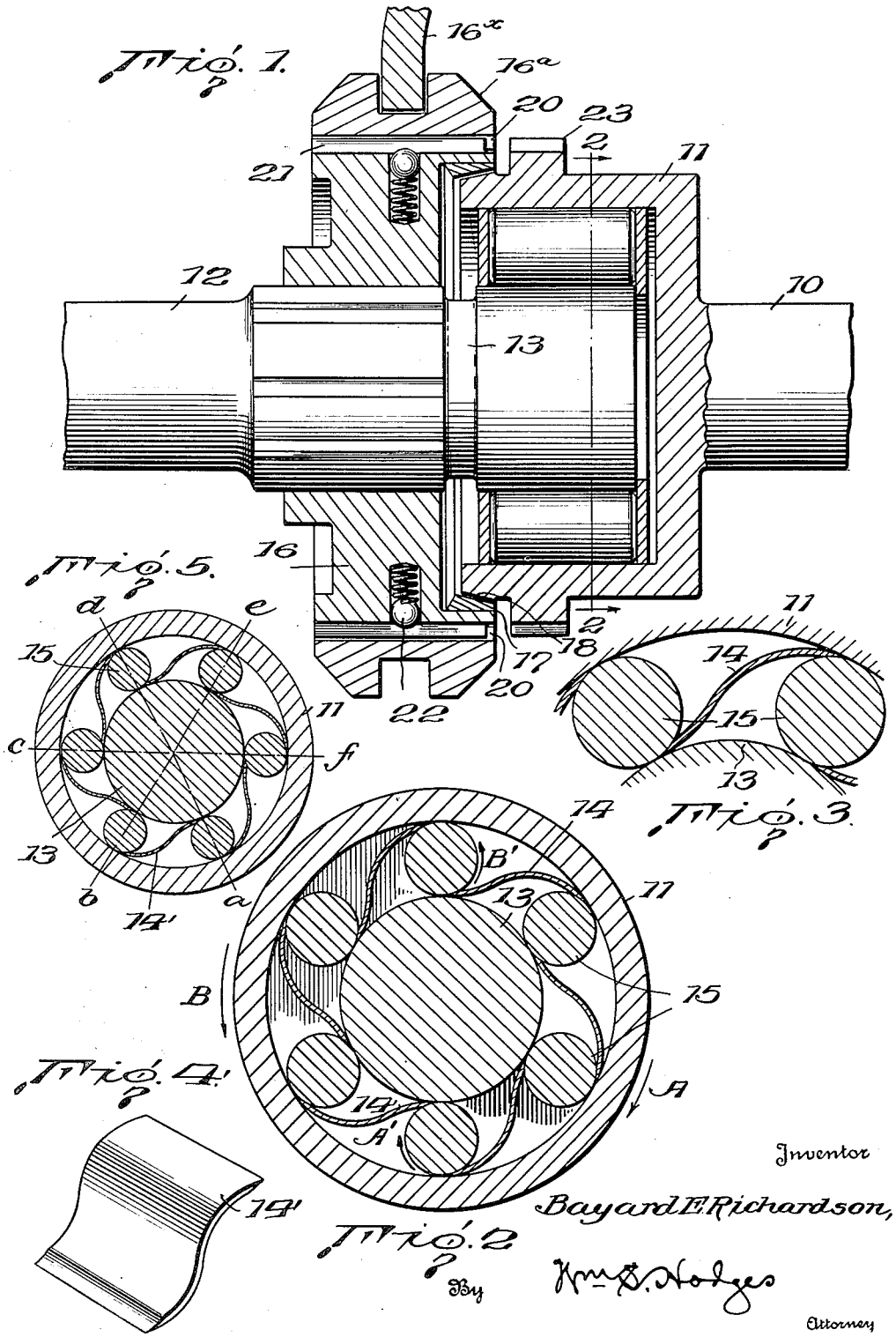

2,079,528

UNITED STATES PATENT OFFICE 2,079,528

CLUTCH

Bayard E. Richardson, Grand Rapids, Mich., assignor to Mechano Gear Shift Company, Grand Rapids, Mich., a corporation of Michigan Application April 25, 1935, Serial No. 18,222

6 Claims. (Cl. 192—45)

This invention is a clutch of the over-running type, primarily designed for use in association with the so-called "free-wheeling" transmission for motor vehicles. The invention, however, is not limited to this particular art.

Free-wheeling transmissions of the type which have heretofore gone into general use have been open to the objection that after a comparatively short mileage, as compared to the normal potential mileage of the other parts of the transmission, the over-running clutches cease to function properly, and frequently have to be displaced. In fact, these defects frequently develop before the vehicle has travelled three thousand miles, and is apparently due to the basic structural characteristics of the clutch.

One of the objects of the present invention is to provide a clutch of the over-running type, which will not only be of general application, but will be so constructed and arranged that it is readily applicable to the standard type freewheeling transmissions, the operating parts thereof being of such character as to avoid the defects of the previous types of "free-wheeling" clutches above referred to. A further object is to provide a clutch of the character above referred to, equipped with floating clutch elements, which, under some conditions of operation, are free to travel in an orbit about the axis of rotation of the rotating parts of the clutch. A further object is to provide a clutch of the over-running type so constructed that the driving and driven shafts may be so arranged as to be positively driven in either direction. A further object is to provide an over-running clutch including roller clutch members so arranged that during the overrunning operations, the said roller clutch members will also function as anti-friction roller bearings.

The invention will be hereinafter fully set forth and particularly pointed out in the claims.

In the accompanying drawing:—

Figure 1 is a longitudinal cross-sectional view illustrating a clutch constructed in accordance with the invention. Figure 2 is a transverse cross sectional view taken on the line 2—2, Figure 1. Figure 3 is an enlarged sectional view illustrating the clutch elements. Figure 4 is a detail view of one of the wedge blocks. Figure 5 is a transverse sectional view illustrating a modification.

Referring to the drawing, 10 designates a driving shaft, which may be connected with any suitable source of power (not shown), one end of said shaft carrying a cylindrical shell 11. The driven shaft 12 is axially alined with the driving shaft, and is provided with a projecting portion 13, which extends into the shell 11 in such manner that the two are concentrically arranged with respect to each other. The bearings for the shafts have not been illustrated, it being understood that said shafts are to be suitably supported by any type of bearings in a manner well understood in the art.

Interposed between the projecting portion 13 of the shaft 12 and the shell 11 are a plurality of spring members or wedge blocks 14, with their longitudinal edges beveled and bearing against the inner surface of the shell 11 and the periphery of shaft 12, in such manner as to impose a spring tension on the plates. Said plates are reversely curved in cross-section, so as to provide body portions arranged approximately tangentially with respect to the surfaces which they engage. It will be noted that said plates extend directly across the intervening spaces between the rollers, in a generally diagonal line, being free of sharp bends, the outer edge of each plate engaging the periphery of a roller at the inner surface of the shell 11 and its inner edge engaging the periphery of the next roller at the outer surface of the projecting portion 13. By means of this arrangement, the necessary resiliency of the wedge blocks 14 is assured without the tendency of the metal to crystallize along sharp bends, under the flexing strains. For purposes of illustration, the wedge members are shown of approximately ogee form in cross-section. The wedge blocks are unsecured except as to their frictional engagement with the shell 11 and shaft 12. Alternating with the wedge blocks and interposed between the shell 11 and shaft 12 are a plurality of rollers 15, with their peripheries in rolling contact with the inner surface of the shell 11 and the periphery of the projection 13. It is to be understood that the number of wedge blocks 14 and rollers 15 may be varied, as desired, without departing from the spirit of the invention, six of each being shown for purposes of illustration.

The parts thus far described provide an overrunning clutch designed to propel the shaft 12 with the driving shaft 10, while rotating in one direction, and to free the shaft 12 while the shaft 10 is rotating in the opposite direction. In operation, assuming that the shaft 12 is stationary or rotating at a slower speed than that of shaft 10, rotation of the shaft 10 and the shell 11 in the direction indicated by the arrow A will cause the rollers 15 to rotate on the periphery of the shaft 12, in the direction indicated by the arrow A'. Because the spring wedges 14 are in intimate contact with the rollers 15, the shell 11 and the shaft 12, said rollers are subjected to a wedging action which tends to force them between the wedges and the periphery of the projection 13 with sufficient force to grip the shaft 12 and to cause it to rotate with the shell 11. Upon rotation of the shell 11 in the opposite direction, as indicated by the arrow B, the rollers 15 will rotate in the direction indicated by the arrow B', so that the wedges will float or slide ahead of said rollers 15, and the clutch will over-run, the wedges and rollers travelling in an orbit about the shaft 11. The assembly will then function as an ordinary roller bearing.

The shafts 10 and 12 may be positively connected together in a manner to neutralize the clutching effect of the wedges 14 and the rollers 15, by providing the shell 11 and the shaft 12 with complemental clutch or gear portions of any preferred form of design, such as are well known in the art. For purposes of illustration, and without intent to limit the invention, a form of synchro-mesh gearing is illustrated. For instance, a clutch member 16 is slidably mounted on the shaft 12 in such manner as to rotate therewith, and is provided with a beveled surface 17, which may engage a complemental beveled surface 18 on the collar 11. A collar 16ᵃ encircles the member 16 and is provided with internal teeth 20, which slidably engage the teeth 21 of said member 16. A yoke 16ˣ provides means for sliding said collar 16ᵃ. The member 16 is provided with a plurality of radially disposed recesses in which are located spring-pressed ball clutches 22, which normally press into complemental recesses in the teeth 20 of collar 16ᵃ. The collar 11 is also provided with peripheral teeth 23.

In operation, with the parts in neutral position, the collar 16ᵃ is shifted by means of the yoke 16ˣ, the tension of the spring clutches 22 being sufficient to cause the member 16 to slide with the collar 16ᵃ as a unit, until the surface 17 of the member 16 engages with the surface 18 of the shell 11. By means of this engagement, the speeds of rotation of the shell 11 and of the shaft 12 are equalized. Continued movement of the yoke in the same direction will then effect disengagement of the collar 16ᵃ from the clutches 22, and will also bring the teeth 20, without clash, into mesh with the teeth 23 on the shell 11, while still maintaining their mesh with the teeth 21 of member 16, whereby the shaft 12 is directly connected with the shaft 10, so as to rotate therewith at the same speed. Under these conditions, the elements 14 and 15 will merely float in the annular space between the shell 11 and the projection 13, and their clutching functions will be completely neutralized. The said elements 14 and 15 are rendered operative the instant that the surfaces 17 and 18 are disengaged.

In the modification illustrated in Fig. 5, the rollers 15 are unequally spaced, that is, they are separated from each other by varying distances, as distinguished from the equi-distant separation illustrated in Figure 2. Referring to Figure 5, an example of the relative spacing is illustrated by means of radial lines. For instance, said lines indicate that the rollers 15 which are positioned to correspond with the lines $a$ and $b$ are spaced 57 degrees apart; those corresponding with lines $b$ and $c$ 58 degrees apart; those corresponding with lines $c$ and $d$ 59 degrees apart; those corresponding with $d$ and $e$ 60 degrees apart; those corresponding with $e$ and $f$ 61 degrees apart; and those corresponding with $f$ and $a$ 65 degrees apart. The advantage of this arrangement is that if there is a soft spot on either of the surfaces contacted by said rollers and indenture occurs, one of the rollers would seek this spot. If the rollers are evenly spaced as illustrated in Figure 2, it would not matter which roller sought the spot, because all of the rollers would be stopped at a point on the shaft where some of the rollers had stopped, and the same condition might develop that caused trouble with the free-wheeling clutches of the type heretofore in general use. However, if the rollers are unevenly spaced, as illustrated in Figure 5, this condition cannot happen except by chance, and that chance would be inversely proportional to the number of rollers in the unit.

It will be obvious to those skilled in the art that although the over-running clutch thus far described is capable of general application wherever a clutch of this type may be required, it is particularly adapted for use in connection with "free wheeling" transmissions. Examples of transmissions of this type are illustrated and described in Letters Patents No. 1,413,058 and No. 1,443,591, which are cited for purposes of illustration and without desire to limit the invention, because it is clearly apparent that it is only necesary to substitute the above-described clutch for the clutches heretofore used for this purpose, and at any desired location in the transmission.

The advantages of the invention will be readily understood by those skilled in the art to which it belongs. For instance, by proper design this clutch may be applied to any type of device or mechanism requiring the conditions above described. It is positive in its gripping or wedging action upon the slightest difference in the speed of rotation between the driving and the driven shafts, in one direction of rotation of the driving shaft, and will freely over-run while the driving shaft is rotating in the other direction. Another important advantage is that unfavorable conditions of lubrication, such as heretofore encountered in free-wheeling clutches heretofore in use, which are due to great differences in temperature will not affect the operation of the clutch. By constructing the wedge members of resilient spring metal of approximately the cross section shown, the necessary tension is applied to the wedges and the rollers to maintain the required intimate contact between the rollers, the driving shell and the driven shaft.

Having thus explained the nature of the invention and described an operative manner of constructing and using the same, although without attempting to set forth all of the forms in which it may be made, or all of the forms of its use, what is claimed is:—

1. A clutch of the character described comprising a cylindrical outer shell, a cylindrical shaft concentrically disposed within the shell, a plurality of cylindrical rollers disposed between the outer shell and the concentric shaft, and normally free to rotate between the two, and diagonally disposed wedge members interposed between the rollers in such manner as to control their direction of rotation with respect to the outer shell and the inner shaft.

2. A clutch of the character described comprising a cylindrical outer shell, a cylindrical shaft concentrically disposed within the shell, a plurality of unequally spaced cylindrical rollers disposed between the outer shell and the concentric shaft and normally free to rotate between the two, and wedge members disposed between the rollers in such manner as to control their direction of rotation with respect to the outer shell and the inner shaft.

3. A clutch of the character described comprising two relatively rotatable members arranged in axial alignment with adjacent end portions, one of said adjacent portions having a cylindrical shell enclosing the adjacent end portion of the other member, and disposed in concentric relation thereto, roller clutch members interposed between and engaging both of the concentric portions of said rotatable members, and resilient reversely curved wedge members interposed between both of the concentric portions of said rotatable members, and alternating with said roller clutch members, said wedge members being so relatively disposed that the portions thereof intermediate of the longitudinal edges are out of contact with said roller clutch members.

4. A clutch of the character described comprising two relatively rotatable concentrically disposed members, roller clutch members interposed between and engaging both concentric members, and elongated wedge members of resilient metal also interposed between said concentric members and alternating with the roller members, with their longitudinal edges in engagement with the latter, said wedge members extending directly across the intervening spaces between the rollers in general diagonal lines, and free of sharp bends.

5. A clutch of the character described comprising two relatively rotatable members arranged in axial alignment with adjacent end portions, one of said adjacent end portions having a cylindrical shell enclosing the adjacent end portion of the other member and disposed in concentric relation relative thereto, roller clutch members interposed between and engaging both concentric portions of said rotatable members, and elongated wedge members of resilient metal interposed between and having their longitudinal edges engaging the respective concentric portions of the rotatable members, said wedge members being of approximate ogee form in cross section and so positioned as to extend diagonally from one roller to another.

6. A clutch of the character described comprising two relatively rotatable members arranged in axial alignment with adjacent end portions, one of said adjacent end portions having a cylindrical shell enclosing the adjacent end portion of the other member and disposed in concentric relation thereto, roller clutch members interposed between and engaging the concentric portions of said rotatable members, and elongated wedge members of resilient metal also interposed between said concentric portions and alternating with said roller members, said wedge members extending diagonally between adjacent rollers and arranged approximately tangentially with respect to the surfaces engaged thereby, said wedge members and said rollers being free to travel in one direction in an orbit around the inner concentric portion of said rotatable members.

BAYARD E. RICHARDSON.